April 24, 1928.                                          1,667,248
L. EISELE
CLINICAL THERMOMETER AND STERILIZING CASE
Filed Aug. 31, 1926
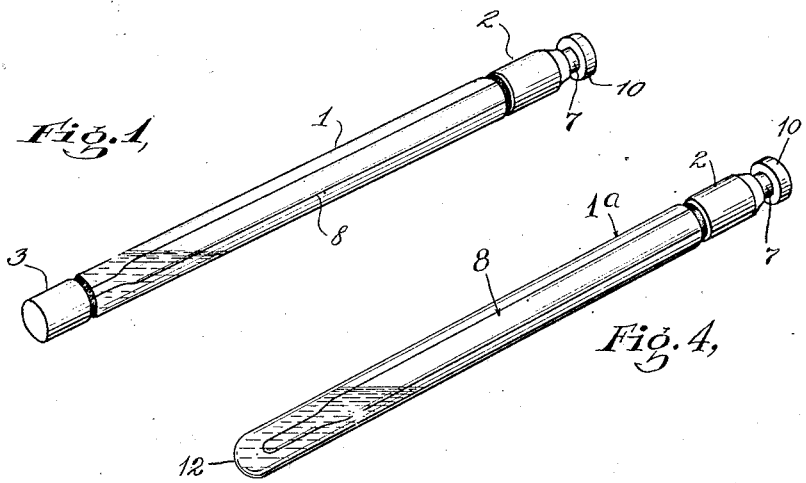
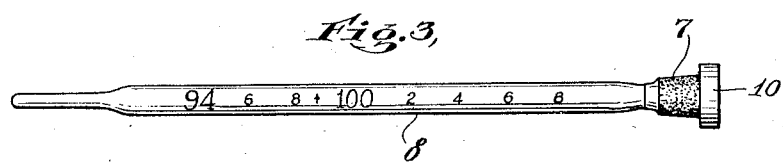
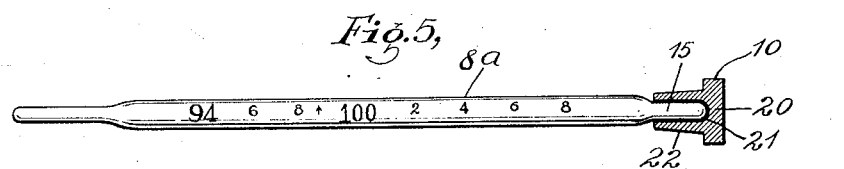
INVENTOR
LOGAN EISELE
BY
ATTORNEY Patented Apr. 24, 1928.

1,667,248

UNITED STATES PATENT OFFICE.

LOGAN EISELE, OF NASHVILLE, TENNESSEE.

CLINICAL THERMOMETER AND STERILIZING CASE.

Application filed August 31, 1926. Serial No. 132,757.

My invention relates to clinical thermometers and especially to an improved sterilizing case for such a thermometer and to the combination of a clinical thermometer with such a case.

Cases have heretofore been provided, designed to hold a sterilizing liquid and to receive and retain a clinical thermometer, the lower portion of which, including the mercury pocket or bulb, is immersed in the liquid in the act of placing the thermometer in the case; and in this way the thermometer is rendered sterile or aseptic for further use, even if other cleansing or sterilizing is neglected.

Such sterilizing cases, however, as heretofore constructed, have usually been of metal, or of glass with a permanently attached metal end portion. Metal cases are unduly heavy and are relatively difficult to clean and sterilize, and glass cases provided with metal end portions have usually had the end portions connected or attached in such a way that it is difficult or impossible to remove them. Such cases consisting of different materials are relatively difficult to properly clean and sterilize, and moreover, when the metal end portions are permanently connected the entire case is lost if the glass tubular portion is broken.

To overcome the above stated and other objectionable features of known devices of this kind, and to produce a sterilizing case of simple and economical construction which has certain advantages hereafter referred to, I provide a case consisting of a glass tubular body having one or both ends accurately formed, as by grinding, with or without a "taper", and a metal end piece or pieces having internal portions formed and accurately dimensioned, to frictionally engage the ends of the tube, so that these metal end portions are tightly and frictionally retained upon the ends of the glass tube, but may be easily removed at any time for thorough cleaning and sterilizing of all the parts, or for replacement of the tube if it is broken, without the expense involved in replacing the broken case with a complete new one. The lower metal end piece or cap may sometimes be omitted. When it is provided, it is in cup form. The upper end piece has an upper internal portion formed to receive the head or plug of a clinical thermometer, so that when the latter is inserted a liquid-tight joint is formed between the head of the thermometer and the socket formation of the upper end-piece, and the joints between the end-pieces and the glass tube are also liquid-tight. The sterilizing liquid is therefore securely retained in the lower portion of the tube and the act of inserting a thermometer causes its lower portion, including the mercury pocket or bulb, to be immersed in the sterilizing liquid.

The invention also includes, in some cases, the provision of a metal head or cap for the thermometer, into which the thermometer is cemented, and which has a plug formation to tightly and detachably fit the upper socket of the upper tube end-piece.

An additional outer case may be provided if desired to additionally protect the inner case and thermometer, but such an outer case does not form a part of the present invention.

The characteristics and advantages of the invention are further sufficiently explained in connection with the following detail description of the accompanying drawing, which shows representative embodiments of the invention. After considering these examples, skilled persons will understand that many variations may be made, and I contemplate the employment of any structures that are within the scope of the appended claims.

In the drawings:

Fig. 1 is a side elevation of a thermometer and case embodying the invention in one form.

Fig. 2 is a view, partly in side elevation and partly in section, of the component parts of the case, separated, ready for connection.

Fig. 3 is a side view of a clinical thermometer adapted for insertion in the case.

Fig. 4 is a side elevation showing a modified form of case.

Fig. 5 is a view, partly in side elevation and partly in section, of a modified thermometer and cap construction.

The case comprises a tubular glass main portion or body 1 (Fig. 1), or 1ᴬ (Fig. 4), and an upper metal end cap 2 (Figs. 1 and 4). A lower metal end cap 3 (Fig. 1) may also be provided in some cases, or otherwise this may be omitted and the lower end 12 of the glass case body may be integral, rounded and sealed, as at 12 (Fig. 4) in the usual way. In either example at least one end of the tubular body is accurately shaped or dimensioned, as by grinding, either in straight, cylindrical form, or is preferably, in some cases, made conical or tapered, as at 4, and when upper and lower end caps are provided, as in Figs. 1 and 2, both ends of the tube are provided with these end formations 4. The upper end cap 2 is of tubular form and has a lower internal socket formation 5 to accurately fit the upper tube end 4, and an upper socket formation 6 to receive and frictionally hold a plug formation provided near the upper end of a clinical thermometer. When a lower end piece or cap, such as 3 is provided, it is of cup form, and has an internal socket 9 to fit the lower end 4 of the tube 1, Figs. 1 and 2.

Fig. 3 shows one suitable form or type of clinical thermometer 8 to cooperate with the case structure. In this example the entire thermometer structure is of glass and includes near the upper end a plug formation 7 to cooperate with the upper socket 6 of the upper metal end cap 2. At the extreme upper end of the thermometer above the plug formation, an enlarged circular knob 10 is usually provided for the convenient manipulation of the thermometer. Fig. 5 shows another type or form of thermometer and cap structure, which is preferred in some cases. In this example the upper end 15 of the thermometer is located in a socket 21 of a metal thermometer head or cap 20. The end 15 of the thermometer may be secured in the cap by cementing or otherwise. This cap has a plug formation 22 to cooperate with the upper or outer socket 6 of the upper metal case cap 2, and outwardly of the plug formation it usually also has an enlarged circular head or finger piece 10, as in the previous example.

All of the stated cooperating formations, including the sockets 5, 6 and 9, and the male or plug formations 4, 7 and 22, are preferably formed by grinding or other appropriate operations to a standard size, and all of the parts are therefore interchangeable, and when the replacement of any part is necessary, because of breakage or for other reasons, the replacement may be economically made, since the case or thermometer need not be returned to the factory for repair when any of the glass parts are broken.

The case, as shown in Fig. 2, is assembled by applying the end piece or pieces to the ends of the tube with moderate pressure and twisting motion, whereupon the tube ends fits tightly and frictionally in the respective socket formations 5 and 9 of the end pieces. The joints so formed are liquid-tight to retain any suitable sterilizing liquid 11, Fig. 1, but the caps or end pieces may at any time be removed from the tube by slight twisting motion, whereupon the separated parts, as shown in Fig. 2, may be easily and completely cleaned and sterilized, or if the tube is accidentally broken, the metal parts may be easily and quickly removed and placed upon a new tube. When the thermometer is placed in the case, as shown in Fig. 1, its ground head or plug portion 7 fits tightly in the upper socket formation 6 of the upper end piece, forming a liquid-tight joint to retain the sterilizing liquid, and the complete case and thermometer may then be carried in the pocket without risk of leakage, or if desired, for greater security against leakage or protection of the case from breakage, it may be placed in an outer case, as above mentioned.

In the type of thermometer shown in Fig. 5 there is greater security against damage or breakage even if the thermometer and case are roughly handled, because the thermometer plug formation 22 is of metal and is therefore very strong and may be tightly inserted in the socket 6 and removed even if it sticks quite tightly in the socket, without risk of breakage which will sometimes occur if a glass plug, such as 7, Fig. 3, sticks tightly in the socket.

While, as above indicated, the cooperating plug and socket formations may be of "straight" or cylindrical shape, in other cases they are desirably, as shown, of tapered or conical formation.

I claim:

1. A case of the class described, comprising a tubular body of glass, and ends of metal, the ends of the body and the interior of the metal ends shaped to provide a friction fit to hold the ends in place, one of the ends having an axial bore to receive a clinical thermometer, the thermometer having a plug formation shaped to frictionally fit the bore whereby to hold the thermometer in place in the bore.

2. A case of the class described, comprising a tubular body of glass, and ends of metal, the ends of the body and the interior of the metal ends shaped to provide a friction fit to hold the ends in place, one of the ends having an axial bore to receive a clinical thermometer, the thermometer having a plug formation shaped to frictionally fit the bore whereby to hold the thermometer in place in the bore, the ends of the body and the plug formation of the thermometer tapered, and the interiors of the metal ends and the bore of the one end shaped to correspond with the parts which they receive.

Signed at Nashville, in the county of Davidson, and State of Tennessee, this 28th day of August A. D. 1926.

LOGAN EISELE.